(12) United States Patent
Shen et al.

(10) Patent No.: US 11,713,865 B2
(45) Date of Patent: Aug. 1, 2023

(54) INTEGRATED PROJECTION AND ILLUMINATION DEVICE

(71) Applicant: ZHEJIANG TAI-G PHOTOELECTRIC TECHNOLOGY CO., LTD., Tongxiang (CN)

(72) Inventors: Hang Shen, Tongxiang (CN); Youwen Zhang, Ankang (CN); Jinhua Wang, Chizhou (CN); Huabin Liu, Changning (CN)

(73) Assignee: ZHEJIANG TAI-G PHOTOELECTRIC TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 17/847,209

(22) Filed: Jun. 23, 2022

(65) Prior Publication Data
US 2023/0011961 A1    Jan. 12, 2023

Related U.S. Application Data

(63) Continuation of application No. PCT/CN2022/086605, filed on Apr. 13, 2022.

(30) Foreign Application Priority Data

Jul. 7, 2021  (CN) .......................... 202121541228.3

(51) Int. Cl.
  *F21V 14/06* (2006.01)
  *F21V 19/00* (2006.01)
  (Continued)

(52) U.S. Cl.
  CPC ............ *F21V 14/06* (2013.01); *F21V 19/003* (2013.01); *G03B 21/145* (2013.01); *G03B 21/2046* (2013.01)

(58) Field of Classification Search
  CPC ........ F21V 14/06; F21V 23/06; F21V 19/003; H04N 9/315; G03B 21/142; G03B 21/145; G03B 21/20; G03B 21/2046
  See application file for complete search history.

(56) References Cited

U.S. PATENT DOCUMENTS

2021/0127510 A1* 4/2021 Su .................... H05K 5/0004

FOREIGN PATENT DOCUMENTS

| CN | 105093792 A | * 11/2015 | ............ G03B 21/16 |
| CN | 211669490 U | * 10/2020 | |

* cited by examiner

*Primary Examiner* — Mariceli Santiago (57) ABSTRACT

Disclosed is an integrated projection and illumination device. The integrated projection and illumination device includes a lamp housing, a mounting assembly, an illumination assembly and a projection assembly; and the mounting assembly includes a mounting disc, a mounting ring and clamping blocks, elastic members being arranged between the clamping blocks and the mounting ring, the mounting disc being provided with top surface connectors and an outer limiting edge, the outer limiting edge being capable of being clamped on the clamping blocks protruding out of the inner wall of the mounting ring, the mounting disc being further provided with pressing blocks, and the pressing blocks rotating along with the mounting disc and being capable of making contact with the clamping blocks and pressing the clamping blocks into the mounting ring during rotation. The present disclosure can be used for illumination and projection, and further features convenient dismounting and mounting.

10 Claims, 6 Drawing Sheets

(51) Int. Cl.
*G03B 21/20* (2006.01)
*G03B 21/14* (2006.01)

INTEGRATED PROJECTION AND ILLUMINATION DEVICE

TECHNICAL FIELD

The present disclosure relates to the technical field of illumination, and in particular to an integrated projection and illumination device.

BACKGROUND ART

The illumination lamp is widely applied to multiple fields such as household illumination, commercial illumination, industrial illumination, road illumination, landscape illumination and special illumination. With long-time development, people have increasingly high requirements on the performance of the illumination lamp, thereby bringing greater challenges to structural design of the illumination lamp.

An existing illumination lamp mainly plays a role of illumination, has single function and accordingly cannot satisfy life requirements of people in many cases, and therefore a space is available for further improvement.

SUMMARY

To solve the defects in the prior art, the present disclosure provides an integrated projection and illumination device, which may be used for illumination and projection and further features convenience dismounting and mounting.

In order to achieve the above objective, the present disclosure provides the following technical solution:

an integrated projection and illumination device includes a lamp housing, a mounting assembly, an illumination assembly, a projection assembly and a height adjustment assembly, where:

the illumination assembly and the projection assembly are mounted in the lamp housing to form an illumination structure and a projection structure;

the mounting assembly includes a mounting disc, a mounting ring and clamping blocks, where the mounting ring is located on a top plate of the lamp housing; the plurality of clamping blocks are all mounted in the mounting ring and may move in a radial direction of the mounting ring, and elastic members for pushing heads of the clamping blocks to protrude out of an inner wall of the mounting ring are arranged between the clamping blocks and the mounting ring; and the mounting disc is provided with top surface connectors and an outer limiting edge, the outer limiting edge may be clamped on the clamping blocks protruding out of the inner wall of the mounting ring, the mounting disc is further provided with pressing blocks, and the pressing blocks rotate along with the mounting disc and may make contact with the clamping blocks and press the clamping blocks into the mounting ring during rotation; and the height adjustment assembly is arranged in the lamp housing and is connected to the projection assembly, so as to drive the projection assembly to vertically move.

Preferably, a sliding plate for being in sliding fit with the clamping blocks is arranged on the top plate of the lamp housing.

Preferably, upper side surfaces of the clamping blocks located at heads are upper guide inclined planes, and an outer edge of the outer limiting edge is folded upwards to match the upper guide inclined planes.

Preferably, left side surfaces and right side surfaces of the clamping blocks located at the heads are left guide inclined planes and right guide inclined planes respectively, and left side surfaces and right side surfaces of the pressing blocks are all of inclined structures and match the left guide inclined planes and the right guide inclined planes respectively.

Preferably, front side surfaces of the clamping blocks located at the heads are provided with limiting grooves, and the pressing blocks are provided with limiting strips capable of matching the limiting grooves.

Preferably, a partition plate is arranged in the lamp housing and divides an interior of the lamp housing into an upper mounting chamber for mounting the projection assembly and a lower mounting chamber for mounting the illumination assembly.

Preferably, the projection assembly includes a projector and an adjusting motor, where:

a projection lens of the projector corresponds to a projection opening of the lamp housing; and the adjusting motor is mounted on a side edge of the projector and drives the projection lens of the projector to rotate by means of a gear set.

Preferably, the height adjustment assembly includes a bottom plate, a height adjustment motor, an adjusting rod and a mounting seat, where the bottom plate is mounted on an upper surface of a partition plate, and a front side of the mounting seat is hinged to the bottom plate and is used for mounting a projector;

a lower end of the adjusting rod is in threaded connection with the bottom plate, and an upper end of the adjusting rod is hinged to a rear side of the mounting plate; and the height adjustment motor is connected to the adjusting rod by means of a gear set, so as to drive the adjusting rod to rotate.

Preferably, a loudspeaker box is further arranged in the lamp housing, and the loudspeaker box corresponds to a loudspeaker box opening on the lamp housing.

Preferably, a lampshade is arranged on a lower opening of the lamp housing, and an inner wall of the lamp housing corresponding to the lower opening is provided with limiting blocks; and an outer side wall of the lampshade is provided with limiting grooves matching the limiting blocks.

The present disclosure has the advantages:

1, a projection function may further be achieved while a basic illumination function is achieved, thereby enriching life pleasure of people;

2, the mounting assembly has the characteristic of convenience dismounting and mounting; and 3, the height adjustment assembly may adjust a projection height of the projector, thereby improving use flexibility.

DETAILED DESCRIPTION OF THE EMBODIMENTS

An integrated projection and illumination device will be further described with reference to FIGS. 1-9.

Figure 1:
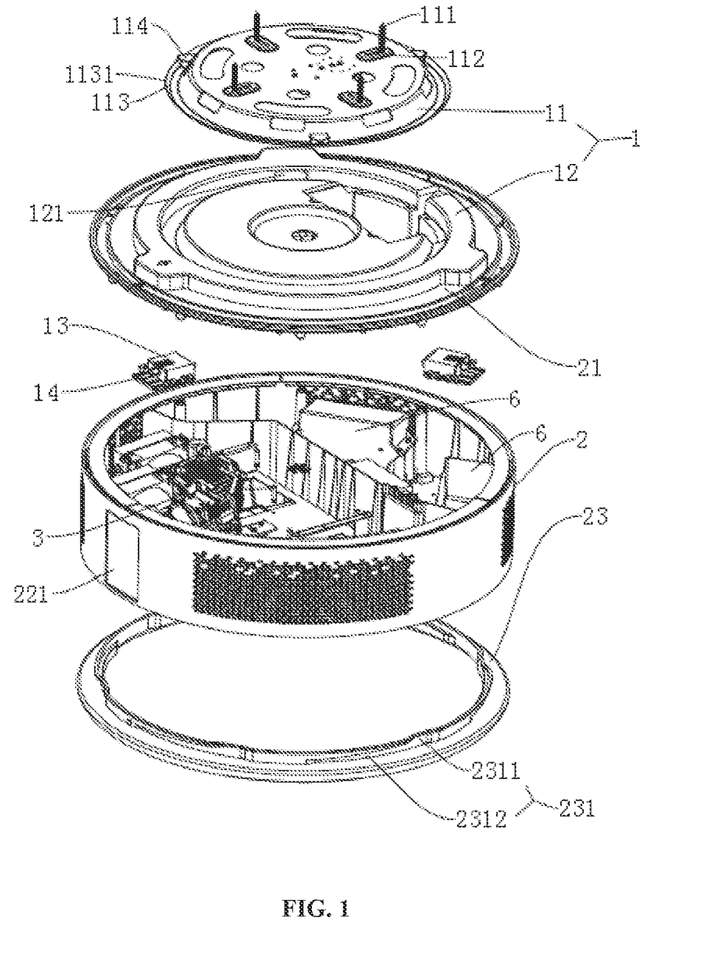
FIG. 1 is an exploded view of an integrated projection and illumination device provided in an embodiment.
Figure 2:
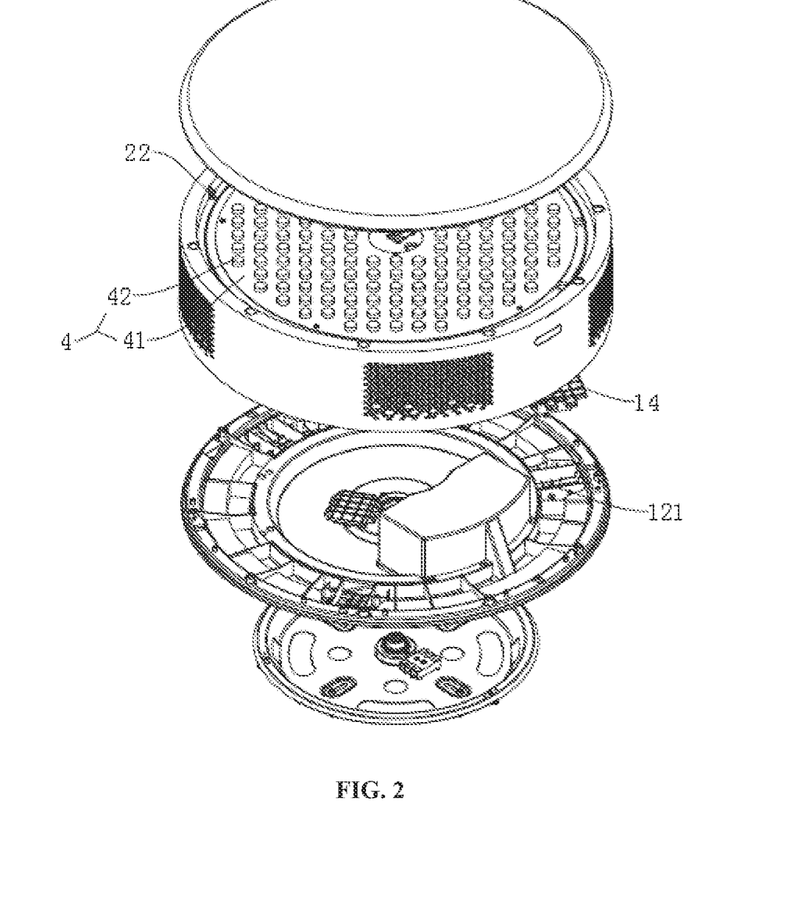
FIG. 2 is a further perspective exploded view of the integrated projection and illumination device provided in the embodiment.

The integrated projection and illumination device includes a circular lamp housing 2, a mounting assembly 1, an illumination assembly 4 and a projection assembly 3.

The lamp housing 2 is provided with an upper opening and a lower opening, a top plate 21 is fixed on the upper opening by means of a bolt, a lampshade 23 is clamped to the lower opening, a projection opening 221 is provided on a side wall of the lamp housing 2, a partition plate is arranged inside the lamp housing 2, and the partition plate divides an interior of the lamp housing 2 into an upper mounting chamber for mounting the projection assembly 3 and a lower mounting chamber for mounting the illumination assembly 4. The illumination assembly 4 corresponds to the lower opening of the lamp housing 2 to form an illumination structure, and the projection assembly 3 is in butt joint connection with the projection opening 221 on the side wall of the lamp housing 2 to form a projection structure. The mounting assembly 1 includes a mounting disc 11, a mounting ring 12 and clamping blocks 13, where the mounting ring 12 is located on the top plate 21 of the lamp housing 2; the three clamping blocks 13 are circumferentially distributed and mounted in the mounting ring 12 and may move in a radial direction of the mounting ring 12, elastic members for pushing heads of the clamping blocks 13 to protrude out of an inner wall of the mounting ring 12 are arranged between the clamping blocks 13 and the mounting ring 12, that is, openings 121 for the clamping blocks to pass therethrough are provided on the inner wall of the mounting ring, and the elastic members are springs; and the mounting disc 11 is provided with top surface connectors 111, the mounting disc 11 is provided with an outer limiting edge 113, the outer limiting edge 113 may be clamped on the clamping blocks 13 protruding out of the inner wall of the mounting ring 12, the mounting disc 11 is further provided with pressing blocks 114, and the pressing blocks 114 rotates along with the mounting disc 11 and may make contact with the clamping blocks 13 and press the clamping blocks 13 into the mounting ring 12 during rotation. A height adjustment assembly is arranged in the lamp housing and is connected to the projection assembly, so as to drive the projection assembly to vertically move.

Specifically, the mounting disc 11 is provided with four kidney-shaped connecting holes circumferentially and evenly distributed, and the top surface connectors are screws 111 matched in the kidney-shaped connecting holes.

A sliding plate 14 in sliding fit with the clamping blocks 13 is arranged on the top plate 21 of the lamp housing 2. The mounting ring 12 may be fixed on the top plate 21 by means of a bolt, in this embodiment, the mounting ring 12 and the top plate 21 are of an integrated structure, the mounting ring 12 protrudes from an upper surface of the top plate 21, the top plate is formed into an upward groove 121 on a position corresponding to the mounting ring, and the groove is provided with a downward notch. The sliding plate 14 is fixed on a lower surface of the top plate 21 by means of a bolt to be in sliding fit with the clamping blocks 13. Positioning columns 135 are arranged at tail ends of the clamping blocks 13, one ends of the springs are mounted on the positioning columns 135 in a sleeving manner, and the other ends of the springs abut against the inner wall of the mounting ring 12, that is, an inner wall of the groove, so as to provide a radial inward thrust for the clamping blocks 13, such that heads of the clamping blocks 13 protrude out of the inner wall of the mounting ring 12 in a natural state.

Figure 4:
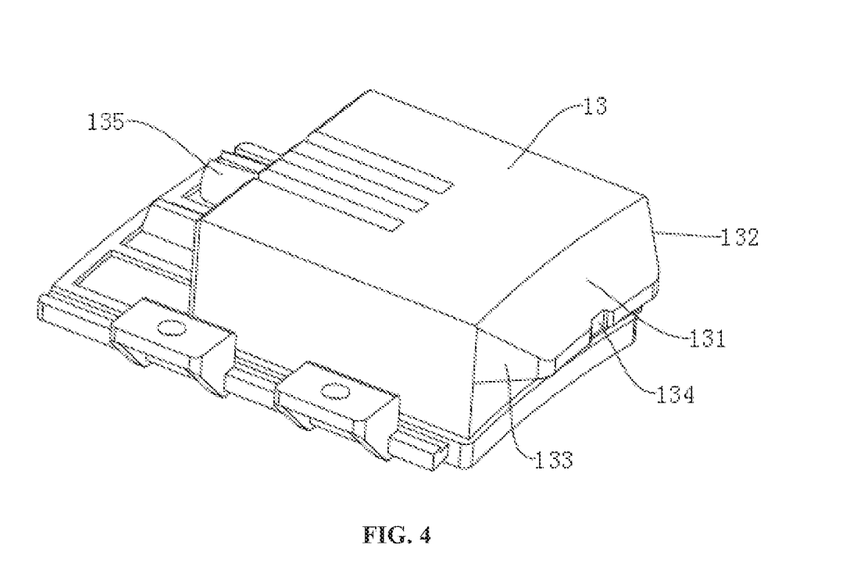
FIG. 4 is a schematic diagram of a clamping block provided in the embodiment.

Upper side surfaces of the clamping blocks 13 located at heads are upper guide inclined planes 131, and an outer edge 1131 of the outer limiting edge 113 is folded upwards to match the upper guide inclined planes 131. In a process that the heads of the clamping blocks 13 are clamped to the outer limiting edge 113, the upper guide inclined planes 131 match and are pressed against the outer edge 1131 of the outer limiting edge 113, such that the heads of the clamping blocks 13 are conveniently pressed into the mounting ring 12, the clamping blocks 13 move to an upper side of the outer limiting edge 113, and lower surfaces of the heads of the clamping blocks 13 are supported on the outer limiting edge 113, thereby fixing the mounting ring 12 and the whole lamp housing on the mounting disc.

Figure 5:
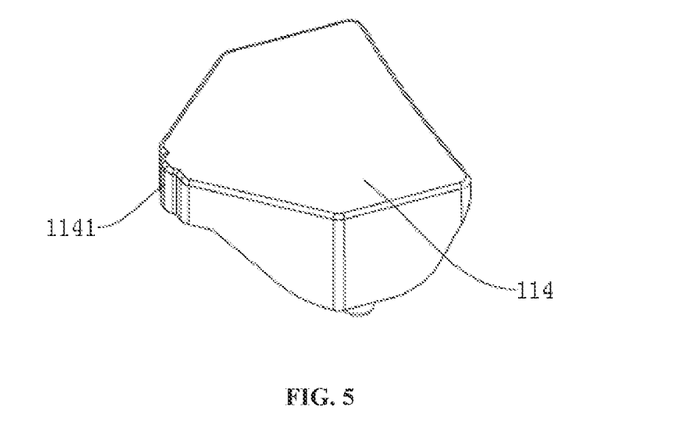
FIG. 5 is a schematic diagram of a pressing block provided in the embodiment.
Figure 6:
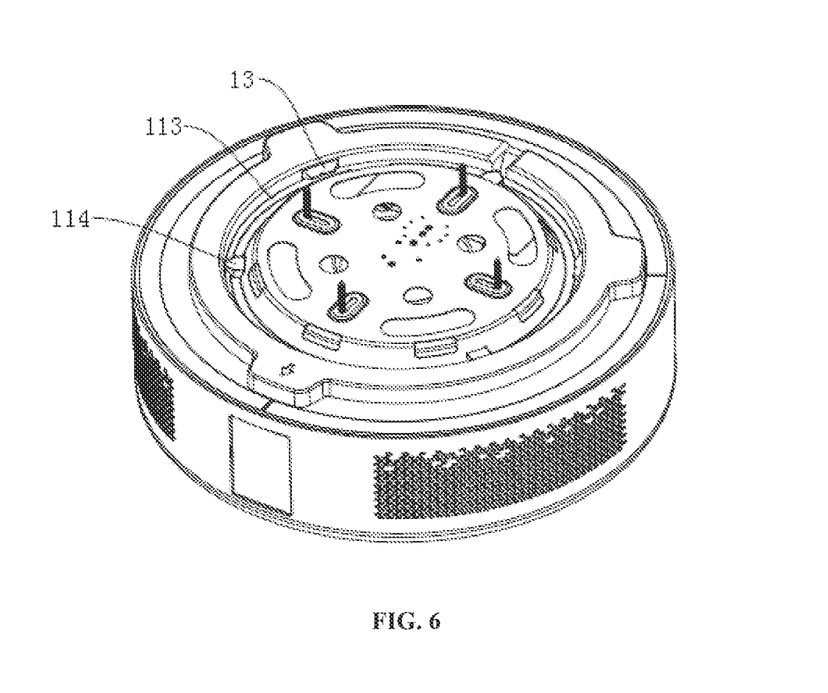
FIG. 6 is a schematic diagram of the integrated projection and illumination device provided in the embodiment.

Left side surfaces and right side surfaces of the clamping blocks 13 located at the heads are left guide inclined planes 132 and right guide inclined planes 133 respectively, and left side surfaces and right side surfaces of the pressing blocks 114 are of an inclined structure and match the left guide inclined planes and the right guide inclined planes respectively. The guide inclined planes may facilitate matching of the pressing blocks 114 with the clamping blocks 13, so as to push the clamping blocks 13 into the mounting ring 12.

Front side surfaces of the clamping blocks 13 located at the heads are provided with limiting grooves 134, and the pressing blocks 114 are provided with limiting strips 1141 matching the limiting grooves 134, so as to improve pressing stability of the pressing blocks to the clamping blocks.

Figure 3:
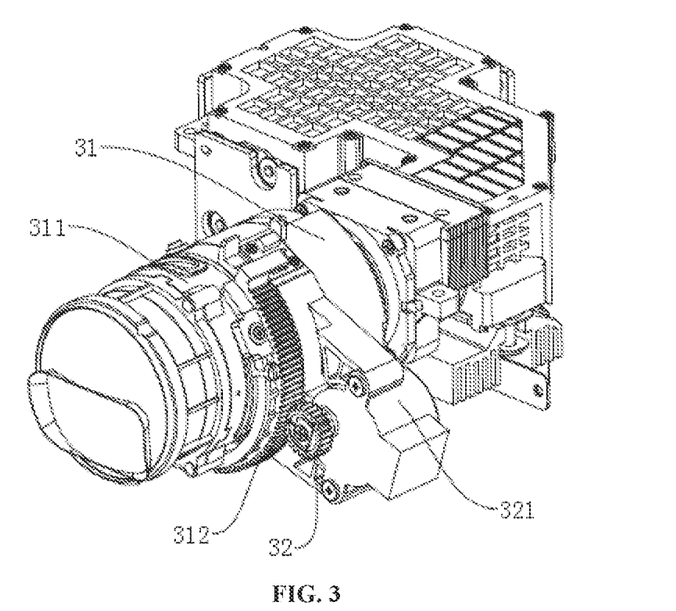
FIG. 3 is a schematic diagram of a projection assembly provided in the embodiment.

The projection assembly 3 includes a projector 31 and an adjusting motor 321, where the projector 31 is fixed to an upper surface of the partition plate, and a projection lens 311 of the projector 31 corresponds to the projection opening 221 of the lamp housing 2, so as to project outwards; and the adjusting motor 321 is mounted on a side edge of the projector 31 and drives the projection lens 311 of the projector 31 to rotate by means of a gear set, that is, the motor is fixed on the side edge of the projector 31 by means of a plate body, an output shaft of the adjusting motor 321 is connected to a gear 32, a gear ring 312 is arranged on the projection lens 311 of the projector 31, and the gear 32 meshes with the gear ring 312, so as to adjust the projection lens 311.

Figure 7:
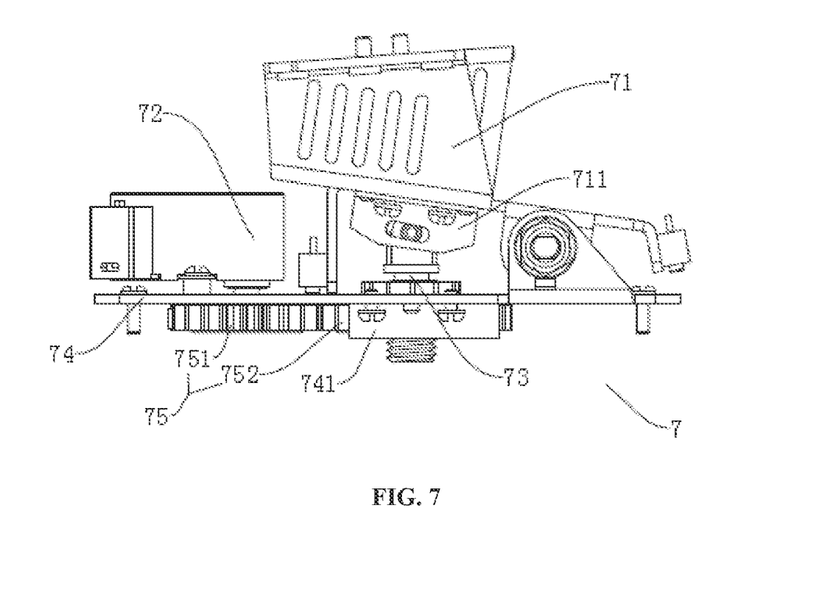
FIG. 7 is a schematic diagram of a height adjustment assembly provided in the embodiment.
Figure 8:
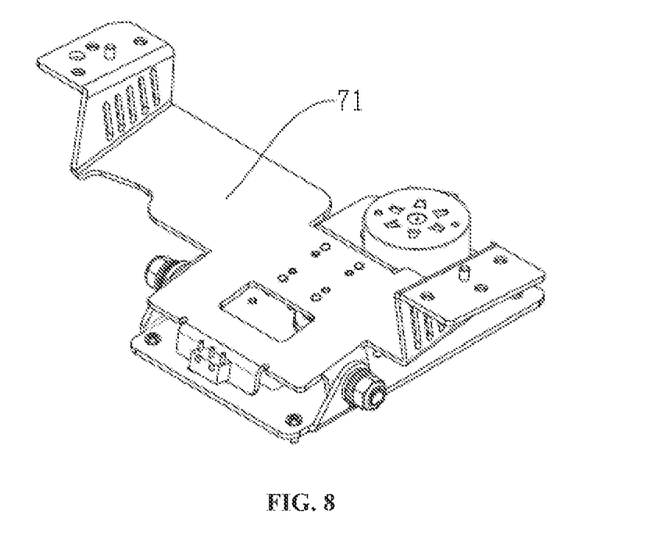
FIG. 8 is another view of the height adjustment assembly provided in the embodiment.
Figure 9:
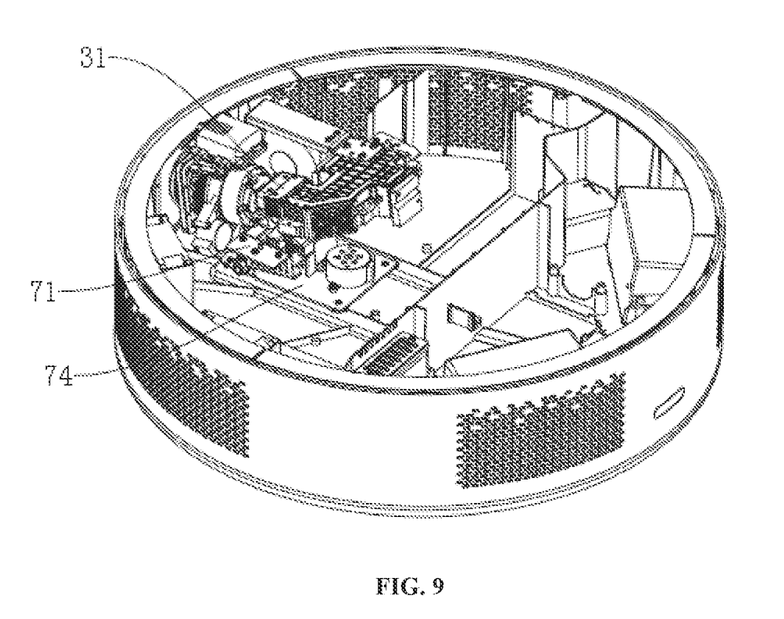
FIG. 9 is a schematic diagram of the height adjustment assembly in a housing for mounting the projection assembly provided in the embodiment.

The height adjustment assembly includes a bottom plate 74, a height adjustment motor 72, an adjusting rod 73 and a mounting seat 71, where the bottom plate 74 is mounted on an upper surface of the partition plate by means of a bolt and is separated from the partition plate, a lower side of the partition plate is connected to a supporting plate 741 by means of a bolt, a front side of the mounting seat 71 is hinged to the bottom plate, and the mounting seat is used for mounting the projector; a lower end of the adjusting rod 73 is in threaded connection with the bottom plate, an upper end of the adjusting rod is hinged to a hinge seat on a rear side of the mounting seat 71, and the height adjustment motor 72 is connected to the adjusting rod 73 by means of a gear set 75, so as to drive the adjusting rod 73 to rotate; that is, the gear set 75 includes a first gear 752 and a second gear 751, where a nut is circumferentially limited in the first gear 752, the first gear 752 and the nut are matched on a threaded section at the lower end of the adjusting rod, and moreover, the first gear 752 is supported on the supporting plate 741; and the height adjustment motor 72 is mounted on the bottom plate 74 in an inverted state, an output shaft of the height adjustment motor passes through the bottom plate to be located on a lower side of the bottom plate, and the second gear 751 is mounted on the output shaft of the height adjustment motor, meshes with the adjusting rod at the same time and may drive the adjusting rod to vertically move, so as to be in linkage with a rear side of the mounting seat to vertically swing to drive the projection lens of the projector to vertically swing, thereby adjusting a projection height.

The illumination assembly 4 includes a lamp panel 41 and lamp beads 42 mounted on the lamp panel 41, where the lamp panel 41 is mounted on a lower side of the partition plate by means of a bolt, and the lamp beads 42 are mounted on a lower surface of the lamp panel 41.

An inner wall of the lamp housing 2 corresponding to the lower opening is provided with four limiting blocks 22 evenly distributed; and an outer side wall of the lampshade 23 is provided with limiting grooves 231 matching the limiting blocks 22. Specifically, each of the limiting grooves 231 includes an inlet section 2311 extending in an axial direction and allowing the limiting blocks 22 to slide therein, and a locking section 2312 extending in a circumference of the lampshade 23 and capable of axially limiting the limiting blocks 22, so as to conveniently dismount and mount the lampshade 23.

A loudspeaker box 6 is further arranged in the lamp housing 2, the loudspeaker box 6 corresponds to a loudspeaker box opening on the lamp housing 2, and the loudspeaker box is a Bluetooth speaker.

In order to further enrich life of a user in the present disclosure, the integrated projection and illumination device further includes a wireless microphone, where the wireless microphone is wirelessly connected to the projector, thereby achieving a karaoke function of the present disclosure.

During use, the present disclosure may further achieve a projection function while achieving a basic illumination function, thereby enriching life pleasure of people; and the projection assembly 3 is provided with the adjusting motor 321, and an angle of the projector 31 may be adjusted by means of the adjusting motor 321.

During mounting, the mounting disc 11 is mounted on a top surface of a room by means of the screws 111, and the kidney-shaped hole 112 structure may conveniently adjust positions of the screws, thereby improving mounting flexibility; and after the mounting disc 11 is fixed, the lamp housing 2 having the mounting ring 12 is clamped on the outer limiting edge 113 of the mounting disc 11. During operation, the mounting disc 11 is aligned in the mounting ring 12, and then the mounting ring 12 is clamped onto the outer limiting edge 113 of the mounting disc 11. In a clamping process, the outer edge 1131 of the outer limiting edge 113 presses the upper guide inclined planes 131 of the heads of the clamping blocks 13, the clamping blocks 13 are pressed into the mounting ring 12, the lamp housing 2 continues moving upwards, after the outer limiting edge 113 of the mounting disc 11 crosses the clamping blocks 13, the heads of the clamping blocks 13 pop up under the action of the springs, and the lower surfaces of the heads of the clamping blocks 13 abut against the outer edge of the outer limiting edge 113 to achieve clamping and fixing. During mounting and clamping, clamping may be achieved as long as the pressing blocks 114 and the clamping blocks 13 are in a staggered state, thereby achieving the characteristic of convenient operation. When the lamp housing 2 is dismounted, the lamp shell 2 is rotated, in a rotating process, the pressing blocks 114 make contact with the clamping blocks 13 to press the clamping blocks 13 into the mounting ring 12, in such a case, the limiting of the heads of the clamping blocks 13 to the outer limiting edge 113 is removed, and the lamp housing 2 may be moved downwards to complete dismounting work.

When the lampshade 23 is required be dismounted to maintain the illumination assembly 4, the lampshade 23 is rotated to make the limiting blocks located at the locking section 2312 move to the inlet section 2311, such that the lampshade may be moved downwards to be separated from the lamp housing 2, and the characteristic of convenient dismounting is achieved.

In the present disclosure, unless otherwise specified, the terms "width", "upper", "lower", "front", "back", "left", "right", "vertical", "horizontal", "top", "bottom", "inner", "outer", "clockwise", "counterclockwise", "axial", "radial", "circumferential", etc. indicate orientational or positional relations on the basis of those shown in the drawings only for ease and simplicity of description of the present disclosure, and are not intended to indicate or imply that the referenced device or element must have a particular orientation and be constructed and operative in a particular orientation, and thus, the terms used in the present disclosure to describe orientation or position relations are illustrative only, and may not be construed as a limitation on the present patent, and those of ordinary skill in the art may understand specific meanings of the above terms according to specific cases with reference to the accompanying drawings.

In the present disclosure, unless otherwise expressly specified and defined, the terms "arranging", "connecting", and "connection" should be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present invention could be understood according to specific circumstances.

What is described above is merely the preferred implementation of the present disclosure, the scope of protection of the present disclosure is not limited to the above embodiments, and all technical solutions following the idea of the present disclosure fall within the scope of protection of the present disclosure. It should be noted that several modifications and adaptations made by those of ordinary skill in the art without departing from the principle of the present disclosure should also fall within the scope of protection of the present disclosure.

What is claimed is:

1. An integrated projection and illumination device, comprising a lamp housing, a mounting assembly, an illumination assembly, a projection assembly and a height adjustment assembly, wherein the illumination assembly and the projection assembly are mounted in the lamp housing to form an illumination structure and a projection structure;

the mounting assembly comprises a mounting disc, a mounting ring and clamping blocks, the mounting ring being located on a top plate of the lamp housing; the plurality of clamping blocks being all mounted in the mounting ring and being capable of moving in a radial direction of the mounting ring, and elastic members for pushing heads of the clamping blocks to protrude out of an inner wall of the mounting ring being arranged between the clamping blocks and the mounting ring; and the mounting disc being provided with top surface connectors and an outer limiting edge, the outer limiting edge being capable of being clamped on the clamping blocks protruding out of the inner wall of the mounting ring, the mounting disc being further provided with pressing blocks, and the pressing blocks rotating along with the mounting disc and being capable of making contact with the clamping blocks and pressing the clamping blocks into the mounting ring during rotation; and the height adjustment assembly is arranged in the lamp housing and is connected to the projection assembly, so as to drive the projection assembly to vertically move.

2. The integrated projection and illumination device according to claim 1, wherein a sliding plate for being in sliding fit with the clamping blocks is arranged on the top plate of the lamp housing.

3. The integrated projection and illumination device according to claim 1, wherein upper side surfaces of the clamping blocks located at heads are upper guide inclined planes, and an outer edge of the outer limiting edge is folded upwards to match the upper guide inclined planes.

4. The integrated projection and illumination device according to claim 3, wherein left side surfaces and right side surfaces of the clamping blocks located at the heads are left guide inclined planes and right guide inclined planes respectively, and left side surfaces and right side surfaces of the pressing blocks are all of inclined structures and match the left guide inclined planes and the right guide inclined planes respectively.

5. The integrated projection and illumination device according to claim 4, wherein front side surfaces of the clamping blocks located at the heads are provided with limiting grooves, and the pressing blocks are provided with limiting strips capable of matching the limiting grooves.

6. The integrated projection and illumination device according to claim 1, wherein:

a partition plate is arranged in the lamp housing and divides an interior of the lamp housing into an upper mounting chamber for mounting the projection assembly and a lower mounting chamber for mounting the illumination assembly.

7. The integrated projection and illumination device according to claim 1, wherein the projection assembly comprises a projector and an adjusting motor, a projection lens of the projector corresponding to a projection opening of the lamp housing; and the adjusting motor being mounted on a side edge of the projector and driving the projection lens of the projector to rotate by means of a gear set.

8. The integrated projection and illumination device according to claim 1, wherein the height adjustment assembly comprises a bottom plate, a height adjustment motor, an adjusting rod and a mounting seat, the bottom plate being mounted on an upper surface of a partition plate, and a front side of the mounting seat being hinged to the bottom plate and being used for mounting a projector;

a lower end of the adjusting rod being in threaded connection with the bottom plate, and an upper end of the adjusting rod being hinged to a rear side of the mounting plate; and the height adjustment motor being connected to the adjusting rod by means of a gear set, so as to drive the adjusting rod to rotate.

9. The integrated projection and illumination device according to claim 1, wherein a loudspeaker box is further arranged in the lamp housing, and the loudspeaker box corresponds to a loudspeaker box opening on the lamp housing.

10. The integrated projection and illumination device according to claim 1, wherein a lampshade is arranged on a lower opening of the lamp housing, and an inner wall of the lamp housing corresponding to the lower opening is provided with limiting blocks; and an outer side wall of the lampshade is provided with limiting grooves matching the limiting blocks.

* * * * *